United States Patent
Bartolini et al.

(10) Patent No.: US 7,885,842 B1
(45) Date of Patent: Feb. 8, 2011

(54) PRIORITIZING SERVICE DEGRADATION INCIDENTS BASED ON BUSINESS OBJECTIVES

(75) Inventors: Claudio Bartolini, Palo Alto, CA (US); Mathias Jean Rene Salle, Palo Alto, CA (US); Abdel Boulmakoul, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1321 days.

(21) Appl. No.: 11/414,637

(22) Filed: Apr. 28, 2006

(51) Int. Cl.
*G06F 17/50* (2006.01)

(52) U.S. Cl. .................. 705/7; 705/8; 705/9; 705/10; 709/224

(58) Field of Classification Search .............. 705/1, 705/7–11; 709/224–229; 370/351
See application file for complete search history.

(56) References Cited

U.S. PATENT DOCUMENTS

| | | | |
|---|---|---|---|
| 5,987,021 A * | 11/1999 | Erickson et al. | 370/347 |
| 6,701,342 B1 * | 3/2004 | Bartz et al. | 709/200 |
| 6,857,020 B1 * | 2/2005 | Chaar et al. | 709/226 |
| 6,859,458 B2 * | 2/2005 | Yuang et al. | 370/395.43 |
| 7,099,879 B2 * | 8/2006 | Tacaille et al. | 1/1 |
| 7,269,157 B2 * | 9/2007 | Klinker et al. | 370/351 |
| 7,343,337 B1 * | 3/2008 | Cieliebak et al. | 705/36 R |
| 7,461,149 B2 * | 12/2008 | Gasca et al. | 709/226 |
| 7,555,408 B2 * | 6/2009 | Berthaud et al. | 702/184 |
| 7,574,502 B2 * | 8/2009 | Clymer et al. | 709/224 |
| 2002/0099578 A1 * | 7/2002 | Eicher et al. | 705/7 |
| 2002/0099579 A1 * | 7/2002 | Stowell et al. | 705/7 |
| 2002/0099580 A1 * | 7/2002 | Eicher et al. | 705/7 |
| 2002/0099598 A1 * | 7/2002 | Eicher et al. | 705/11 |
| 2002/0152305 A1 * | 10/2002 | Jackson et al. | 709/224 |
| 2003/0225549 A1 * | 12/2003 | Shay et al. | 702/182 |
| 2004/0003087 A1 * | 1/2004 | Chambliss et al. | 709/226 |
| 2004/0117224 A1 * | 6/2004 | Agarwal et al. | 705/7 |
| 2004/0136379 A1 * | 7/2004 | Liao et al. | 370/395.21 |
| 2005/0010456 A1 * | 1/2005 | Chang et al. | 705/7 |
| 2005/0066239 A1 * | 3/2005 | Keeton et al. | 714/47 |
| 2005/0096949 A1 * | 5/2005 | Aiber et al. | 705/7 |
| 2005/0165925 A1 * | 7/2005 | Dan et al. | 709/224 |
| 2005/0172027 A1 * | 8/2005 | Castellanos et al. | 709/229 |
| 2005/0198231 A1 * | 9/2005 | Gasca et al. | 709/221 |
| 2005/0283376 A1 * | 12/2005 | Miyoshi et al. | 705/1 |
| 2006/0133296 A1 * | 6/2006 | Berthaud et al. | 370/252 |
| 2006/0171509 A1 * | 8/2006 | Berthaud et al. | 379/1.04 |
| 2006/0188011 A1 * | 8/2006 | Goldszmidt et al. | 375/229 |
| 2006/0280161 A1 * | 12/2006 | Liu et al. | 370/351 |
| 2007/0083650 A1 * | 4/2007 | Collomb et al. | 709/224 |
| 2007/0112723 A1 * | 5/2007 | Alvarez et al. | 707/2 |
| 2007/0219837 A1 * | 9/2007 | Lu et al. | 705/8 |

OTHER PUBLICATIONS

Bartolini et al. (Business Driven Prioritization of Service Incidents; Bartolini, Claudio; Salle, Mathias; A. Sahi and F. Wu (Eds.): DSOM 2004, LNCS 3278, pp. 64-75, 2004. IFP International Federation for Information Processing 2004).*

* cited by examiner

*Primary Examiner*—Romain Jeanty
*Assistant Examiner*—Alan Miller

(57) ABSTRACT

Embodiments of the present invention pertain to prioritizing services based on business objectives is described. According to one embodiment, a probability of a service violation occurring within a predetermined time period is determined based on a service level jeopardy threshold being exceeded. The probability of a service violation corresponds to an incident. An alignment of the service level violation with a business objective is computed based on the probability of the service level violation. The incident is prioritized based on the alignment.

6 Claims, 7 Drawing Sheets

PRIORITIZING SERVICE DEGRADATION INCIDENTS BASED ON BUSINESS OBJECTIVES

TECHNICAL FIELD

Embodiments of the present invention relate to managing service degradation incidents. More specifically, embodiments of the present invention relate to managing service degradation incidents by prioritizing the service degradation incidents.

BACKGROUND ART

Many businesses have relatively large computer installations that include many types of computer equipment, such as clients, servers, storage devices, and networks of various types, services, among other things. Providing services and computer resources shall be defined herein as "IT services." It has become common practice for one business, e.g., "IT service provider," to provide a wide array of IT services to another business such as an "outsourcing customer." As a part of the lease, agreements as to the level of service are made between the two businesses. These agreements are also commonly known as service level agreements (SLAs) and the level of services are also commonly known as service level objectives (SLOs).

As the computer installations are used to provide various services, problems can occur. These problems are the underlying cause of incidents, according to one embodiment. Incidents are any degradation of service which a user, such as an outsourcing customer, experiences, according to one embodiment. Examples of incidents are degradation in the quality of service according to some measurement of quality service, unavailability of service, hardware failure, and detection of a virus, any of which could result in degradation of one or more services.

Not meeting a service level objective results in what is commonly known as a "service level objective violation." Frequently, an IT service provider will be subjected to direct financial penalties or indirect financial repercussions in the event of a service level objective violation.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
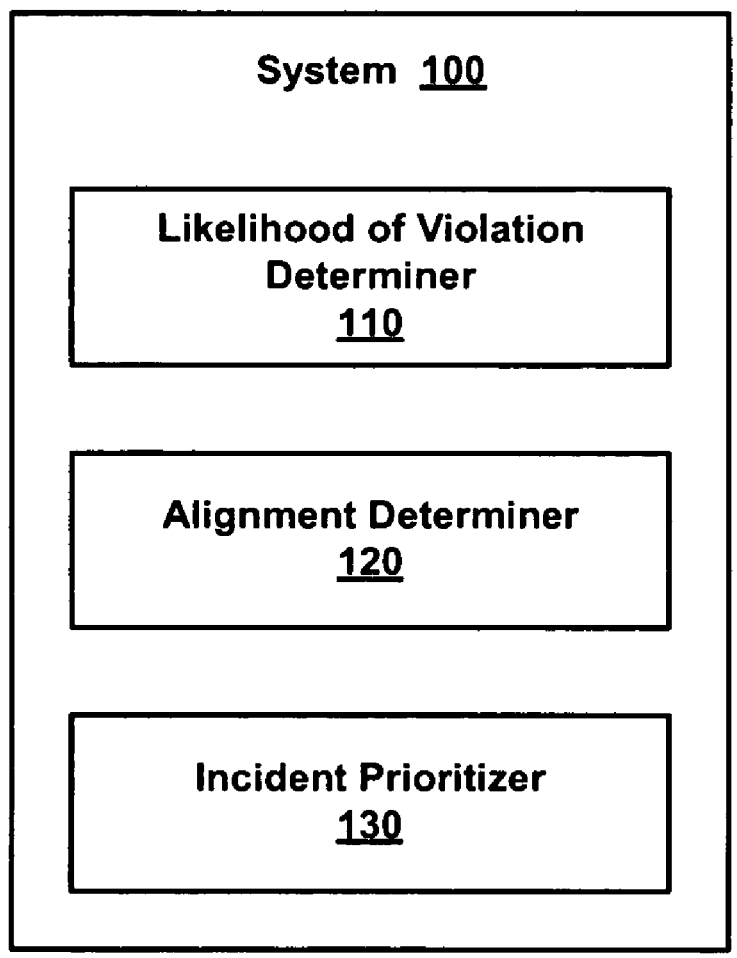
FIG. 1 depicts a block diagram of a system for prioritizing service degradation incidents based on business objectives, according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

As already stated, frequently the business that leases computer equipment will be subjected to direct financial penalties or indirect financial repercussions in the event of a service level objective violation. Therefore, it is desirable to avoid or at least to minimize direct financial penalties and indirect financial repercussions. According to one embodiment, a method and a system that prioritizes service level degradation incidents based on business objectives is used to eliminate or reduce financial penalties and repercussions. By prioritizing service degradation incidents based on business objectives, businesses are enabled to align the delivery of services with the business objectives.

For example, an IT service provider A may lease computer resources to two outsourcing customers B and C. Both outsourcing customer B and C may experience incidents that impact the delivery of their services. Frequently, IT service provider A may have to make a choice between fixing an incident for outsourcing customer B or an incident for outsourcing customer C. According to one embodiment, the order in which incidents are fixed is prioritized based on business objectives. For example, if outsourcing customer C pays more money than outsourcing customer B to IT service provider A, then outsourcing customer C's incident may receive a higher priority than outsourcing customer B's incident, as will become more evident. In another example, one incident A may be a symptom of another incident B. In this case, incident B may be assigned a higher priority than incident A. In a third example, both outsourcing customer B and C may be experiencing degradation of service. However, outsourcing customer B's incident will turn into an SLO violation sooner than outsourcing customer C's incident. Therefore, outsourcing customer B's incident receives a higher priority.

Service Degradation Incidents

A Service Level Agreement (SLA) can be contracted with a customer and can contain a set of Service Level Objectives (SLOs). Each SLO can specify an acceptable range of values for a given system metric, through for example the definition of a violation threshold for the SLO. A penalty cost can be associated with an SLO violation, which for example occurs when the metric value surpasses the violation threshold. Besides the violation threshold, a jeopardy threshold can also be specified.

Metric values can be obtained by probes deployed by a management system, such as system 700 as will become more evident, and monitored by a monitoring component. A monitoring component can detect and report degradation, for example, when a metric value surpassing the jeopardy threshold for the SLO.

A management system can collect and organize the information about incidents, for example, by assigning priority values to the incidents along with other information on the lifecycle of a trouble ticket, which can be used as a part of handling the incident. By prioritizing incidents, for example based on business objectives, the cost of violations can be minimized, according to one embodiment.

For more information on ITIL refer to The Office of Government Commerce, "IT infrastructure library, ITIL," The stationery Office, June 2000. ASIN: B000CDSQ06, the contents of which are incorporated herein.

A System of Prioritizing Service Degradation Incidents Based on Business Objectives FIG. 1 depicts a block diagram of a system for prioritizing service degradation incidents based on business objectives, according to one embodiment of the present invention. The blocks that represent features in FIG. 1 can be arranged differently than as illustrated, and can implement additional or fewer features than what are described herein. Further, the features represented by the blocks in FIG. 1 can be combined in various ways. The system 100 can be implemented using software, hardware, firmware, or a combination thereof.

The system 100 includes a likelihood of violation determiner 110, an alignment determiner 120 and an incident prioritizer 130. As will become more evident, the likelihood of violation determiner 110 receives a likelihood of a service level objective violation occurring as a function of an amount of time taken to close a service degradation incident. The alignment determiner 120 computes an alignment with business objectives as a function of the likelihood of the service level objective violation occurring. The incident prioritizer 130 prioritizes the service degradation incident to maximize the alignment with the business objectives.

Figure 2:
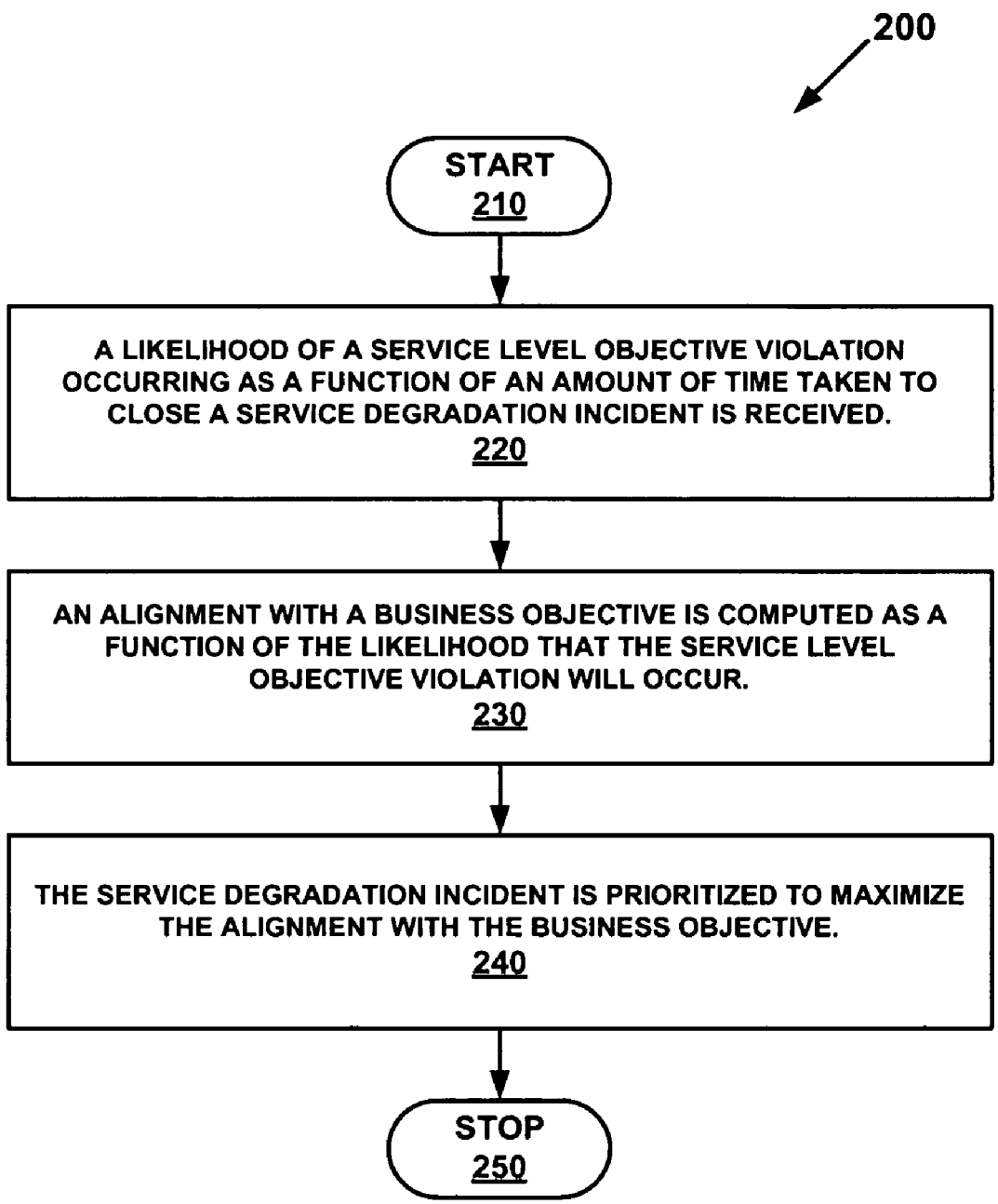
FIG. 2 depicts a flowchart for a method of prioritizing service degradation incidents based on business objectives, according to one embodiment of the present invention.

A Method of Prioritizing Service Degradation Incidents Based on Business Objectives FIG. 2 depicts a flowchart for a method of prioritizing service degradation incidents based on business objectives, according to one embodiment of the present invention. Although specific operations are disclosed in flowchart 200, such operations are exemplary. That is, embodiments of the present invention are well suited to performing various other operations or variations of the operations recited in flowchart 200. It is appreciated that the operations in flowchart 200 may be performed in an order different than presented, and that not all of the operations in flowchart 200 may be performed.

All of, or a portion of, the embodiments described by flowchart 200 can be implemented using computer-readable and computer-executable instructions which reside, for example, in computer-usable media of a computer system or like device. As described above, certain processes and operations of the present invention are realized, in one embodiment, as a series of instructions (e.g., software program) that reside within computer readable memory of a computer system and are executed by the of the computer system. When executed, the instructions cause the computer system to implement the functionality of the present invention as described below.

In 210, the method begins.

In 220, a likelihood of a service level objective violation occurring as a function of an amount of time taken to close a service degradation incident is received, for example by a likelihood of violation determiner 110. For example, an information technology (IT) manager can specify a time value that represents the expected amount of time that it will take to move from the jeopardy state to the violation state if no measures are taken. For the sake of illustration, assume it will take an exponential distribution of the time to go from jeopardy to violation if no corrective actions are taken. The parameter of the exponential distribution, $\lambda$, can be defined as the inverse of the expected time from jeopardy to violation.

Figure 3:
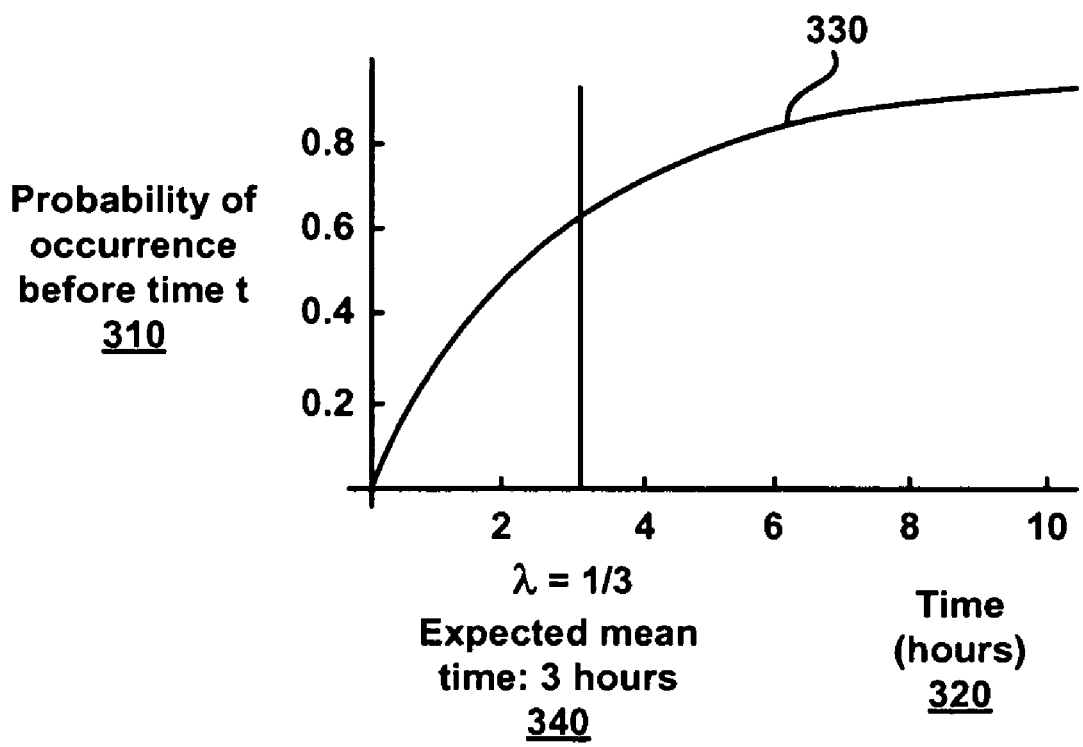
FIG. 3 depicts a graph 300 for the likelihood of a violation to occur before a given time t, according to one embodiment.

FIG. 3 depicts a graph 300 for the likelihood of a violation to occur before a given time t, according to one embodiment. For example, the y axis 310 represents the cumulative distribution function of the distribution of probability associated with the time it may take to move from a jeopardy state to a violation state. The x axis 320 represents time in hours. The curve 330 of the graph 300 can be quantified by the equation: $1-e^{-\lambda t}$, where p represents the probability of a violation if the incident is closed after time t from its starting time. In the example given, for a value 340 of $\lambda=\frac{1}{3}$, corresponding to an expected mean time of 3 hours, the probability of a violation occurring within 4 hours from the jeopardy alarm if no measures are taken can be represented by the equation $1-e^{-4/3}=$ 76%. According to one embodiment, an IT manager can use the projected 3 hours and equations, such as $1-e^{-\lambda t}$, to calculate the 76%. In this case, the IT manager can input the 76% into the system 100 and the violation determiner 110 can receive the 76%. In another embodiment, the IT manager can input the projected 3 hours into the system 100 and the violation determiner 110 can receive the 3 hours. Then the violation determiner 110 can use equations, such as $1-e^{-\lambda t}$, to calculate the 76%.

In 230, an alignment with business objectives is computed as a function of the likelihood that the service level objective violation will occur, for example by the alignment determiner 120. For example, by computing the alignment with business objectives as a function of the likelihood that a violation will occur, the impact of the violation on the business objectives can be determined.

Figure 4:
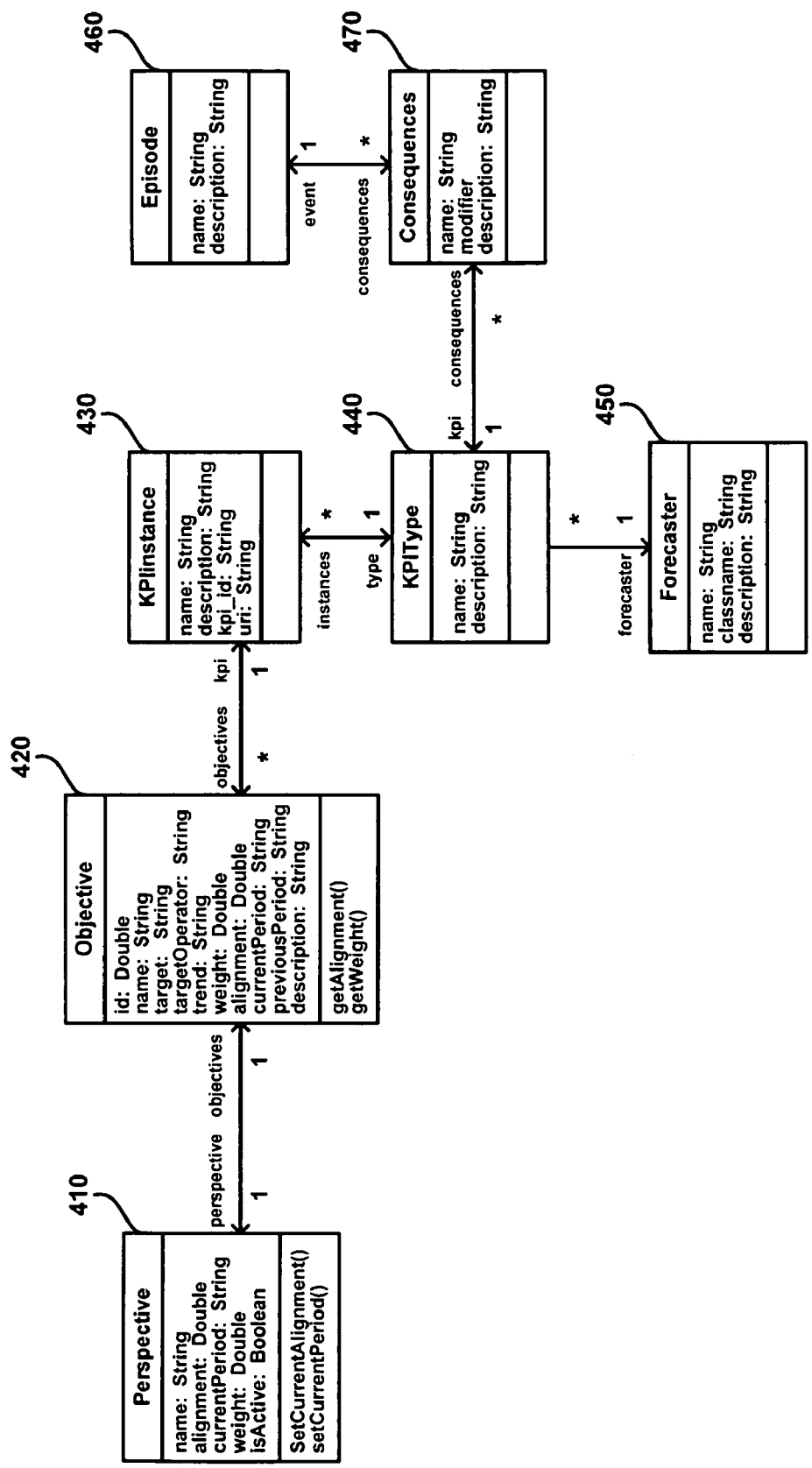
FIG. 4 depicts a business objectives information model 400, according to one embodiment.

A business objectives information model, which can be used as a part of representing business objectives, shall first be described. FIG. 4 depicts a business objectives information model 400, according to one embodiment. Object oriented programming can be used as a part of implementing a business objectives information model 400. For example, the model 400 is implemented using classes 410-470 for instantiating objects to provide software implementation of various concepts, such as: objectives, key performance indicators (KPIs), and perspectives.

For more information on concepts related to objectives and KPIs refer to IT Governance Institute, "Control Objectives for Business Information related Technology, COBIT, $3^{rd}$ edition", Information Systems Audit and Control Association, 2003, ISBM: 1893209148, the contents of which are incorporated herein. COBIT is a framework addressing the management's need for control and measurability of IT. It provides a set of tools and guidelines to assess and measure an installation's IT capability for the principal IT processes.

According to one embodiment, perspectives 410 are used to bundle objectives 420 together that concern a certain angle of a business. For more information on concepts related to perspectives refer to R. S. Kaplan, D. P. Norton, "The Balanced Scorecard: Translating Strategy into Action" Harvard Business School Press, 1996, ISBM: 0875846513. A balanced scorecard can enable businesses to clarify their vision and strategy by defining actionable objectives. Examples of perspectives 410 include but are not limited to financial, customer, business process, and learning and growth, according to one embodiment.

Model 400 defines a perspective 410 as the first class, thus not limiting its usage to the traditional balance scorecard model, according to one embodiment. According to one embodiment, perspectives 410 do not represent a partition over the set of defined objectives 420. For example, an objective 420 can belong to more than one perspective 410.

For the sake of illustration, an example of an objective 420 defined through the model 400 could be "the aggregate service revenue generated over a three-month period must be above $100,000." This can be modeled, for example, by defining a KPI t representing the aggregate cost of a SLA penalty paid over the current three month period, represented by a dollar amount. A KPI space is all of the possible values that could be generated for a KPI, as will become more evident. The target of the objective 420, according to one embodiment, is the region in the KPI space characterized by the inequality t<$100,000.

An example of a perspective 410 is a financial perspective, containing an objective 420 such as "the aggregate service revenue generated over the current three-month period must be above $100,000." In another example, an objective 420 can define a target for a KPI representing the aggregated revenue generated in a given time period. A customer perspective 410 could contain objectives 420 defining targets for some KPIs representing quantitative measures of the customer satisfaction and so on. An example of a quantitative measurement of customer satisfaction is the commonly known measurement of total customer experience (TCE).

A forecaster object instantiated using a forecaster 450, according to one embodiment, can be associated with each object instantiated using KPItype 440. The forecaster objects can be used to yield an estimate of the future value of KPIs. The "Forecasting the Impact of Likely Violations" section, included hereinafter, describes a specific example of an implementation of a forecaster 450 for a particular type of KPI.

A forecaster 450 can be used in a more general way. For example, a forecaster can output an estimate of the future values of KPIs of a given type. The estimate can be captured as a distribution of probability over the relevant KPI spaces. This estimate is also referred to herein as a "likely outcome."

A forecaster 450 could be implemented to receive information, that a business expert for example provides, as to how likely the business expert thinks that revenue in excess of $40,000 dollars will be posted for this month for example using various embodiments described in 220. Further, the forecaster 450 can use a simple normal distribution module using revenue from the previous month, the mean of the normal distribution and a variance of the normal distribution, as will become more evident. Alternatively, a more complex methodology could be used to take into a great number of variables, such as a methodology similar to that proposed by G. E. P. Box et al. "Time series analysis: forecasting and control," Holden Day, San Francisco 1976.

An episode 460, according to one embodiment, can be used to represent an event whose occurrence may have an impact on the values of the KPIs. An example of an episode is an SLO violation. Typically there are a few different types of episodes which can easily be modeled in terms of metrics that underlay KPIs. More information on various ways to implement episode 460 shall be provided hereinafter.

An IT manager may take certain actions to prevent an episode from occurring. A consequence 470, according to one embodiment, is used to predict a consequence of an action that an IT manager may take, according to one embodiment. The consequence that an episode has on a particular type of KPI can be expressed as a function of KPI metrics. For example, the consequence that an SLO violation has on an "aggregate number of violations KPI," according to one embodiment is the number of violations increased by one which can be represented by the equation $f(KPI_{violations})= KPI_{violations}+1$, which will be described in more detail hereinafter.

The model 400 can be used to assign importance weights to objectives 420 or perspectives 410. The weights can be used by the system 100 to compare utility values of different objectives. The weight assigned to one perspective 410 can be propagated down to the objectives 420 belonging to that perspective 410, as exemplified in Table 1, according to one embodiment.

TABLE 1

Objectives, perspectives and importance weights

| Perspective | Financial | | Customer |
|---|---|---|---|
| weight | 80% | | 20% |
| Objective | Aggregated revenue in three month period | Aggregated cost of penalties for violation in three month period | Total customer experience |
| weight | 40% | 60% | 100% |
| Adjusted weight for perspective | 32% | 48% | 20% |

Alignment with Business Objectives as Utility of Management Options

Figure 5:
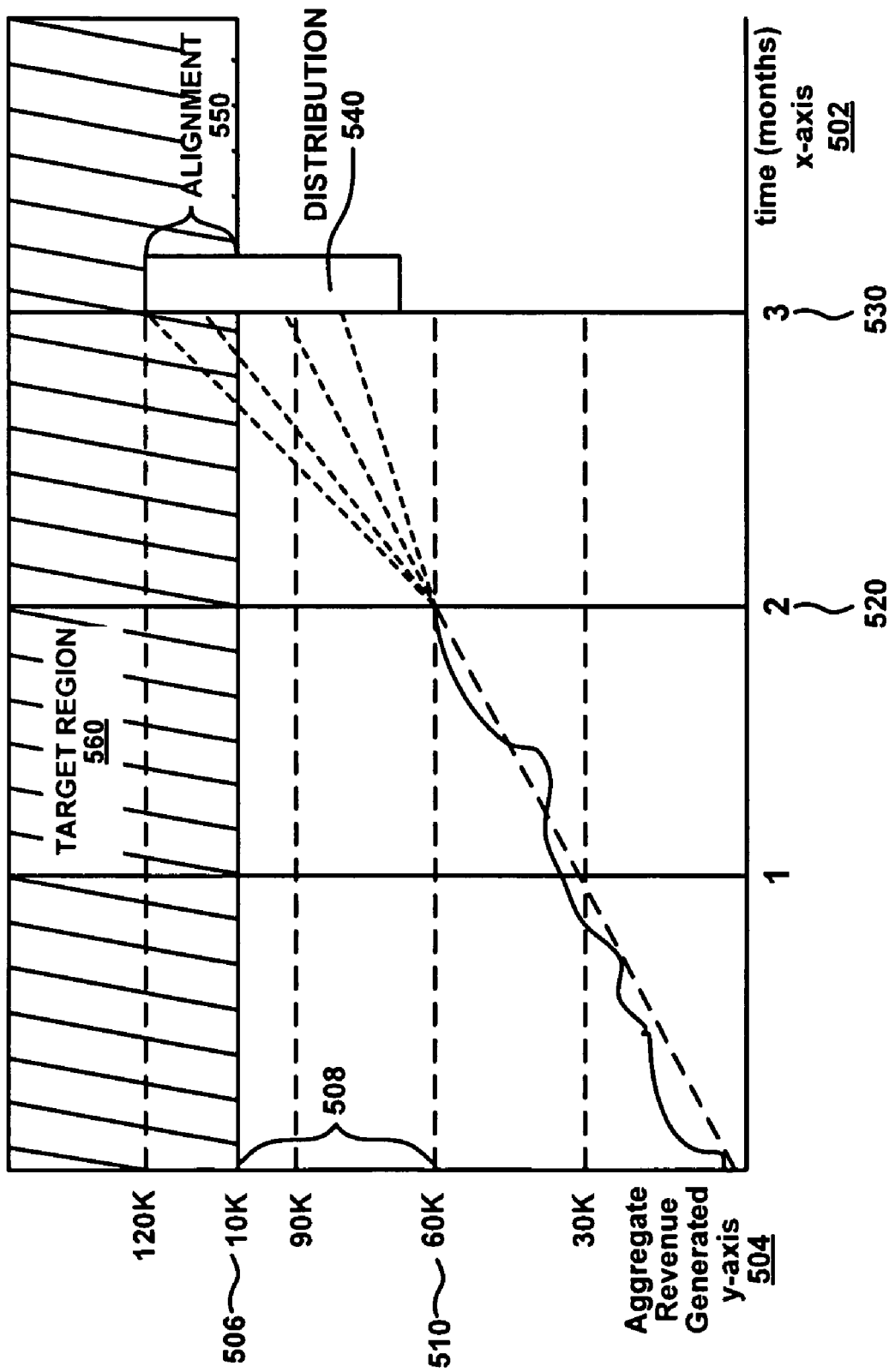
FIG. 5 is a graph that illustrates an example of an alignment with business objectives as a function of the likelihood of the service level objectives violation, according to one embodiment.

According to one embodiment, the alignment with a given business objective is defined as the measure of the likelihood—given, for example, the best knowledge about the current situation—that the objective will be met. FIG. 5 is a graph that illustrates an example of an alignment with business objectives as a function of the likelihood of the service level objectives violation, according to one embodiment. The x axis 502 represents time in months. The y axis 504 represents the aggregate revenue generated. Generated aggregate revenue is an example of a KPI and all of the possible values that could be generated for aggregate revenue is an example of a KPI space. Therefore, the y axis 502 represents a KPI space for a particular type KPI.

Continuing the example of the objective "the aggregate service revenue generated over the current three-month (KPI) period must be above $100,000" as depicted by target region 560. The target of $100,000 is depicted at point 506. For the sake of illustration, assume that 2 months 520 into the period the aggregate revenue FIG. 510 amounts to $60,000 at point 510. For the sake of illustration also assume, that the middle of the distribution 540 is at $90,000 and ranges from $67,500 to $112,500 resulting in an interval of $0 to $45,000. Further the sake of illustration, assume that estimation indicates that the revenue for the last month is distributed 540 during the interval from $0 to $45,000. For the sake of simplifying the calculations used in illustrations, distribution 540 shall be assumed to be uniform.

The alignment 550 represents the part of the distribution 540 that intersects the target region 560, which is $100,000-$112,500. The alignment determiner 120 can compute that the likelihood of meeting the objective is equal to the likelihood of posting a top line figure for the last month of the quarter in excess of $100,000-$60,000=$40,000, e.g., $40,000 at reference 508, that amounts to 11.11% based on the calculation of ($45,000-$40,000)/$45,000, according to one embodiment. This computation, such as 11.11%, is an example of an alignment with the business objectives of the service level objective violation.

According to one embodiment, an estimate of the future value of the KPIs is used. The estimate can be calculated, for example, based on a distribution 540 of the probability over the relevant KPI spaces. For example, the distribution 540 can represent the distribution of likely revenue outcomes. This estimate can also be referred to as a "likely outcome." An outcome can be characterized by the distributions of probability over the KPI spaces that it entails.

According to one embodiment, a default outcome, which is the outcome assuming a violation will not occur, is calculated. For example, the default outcome can be calculated as a mean value of the KPI that can be predicted at the end of the period, for example, by extrapolating its current value. The forecasted value of the KPI can be considered to be normally distributed 540 with the mean calculated as already described herein and the variance set at a sensible customized value, for example the square of 5% of the mean value. For example as depicted in FIG. 5, when the revenue KPI is $60,000, as illustrated at point 510, two months 520 into the period, the estimate can be forecast at the end of the three month period 530 to be normally distributed with mean $90,000 and a variance of $4,500, e.g., 5% of $90,000, and therefore characterized by the following equation:

$$Pdf_{default}(kpi_{revenue})=NORMALDISTRIBUTION(\$90{,}000,(\$4{,}500)^2)(kpi_{revenue}) \quad (1)$$

Forecasting the Impact of Likely Violations

As already stated, a forecaster 450 could be implemented to receive information that a business expert for example provides, as to how likely the business expert thinks a revenue figure in excess of $40,000 dollars will be posted for this month. Further, the forecaster 450 can use a simple normal distribution module using revenue from the previous month. Continuing the example of a normal distribution of $90,000 and variance of $4,500, the forecaster 450 could be implemented to use the parameters $90,000, ($4,500)² with various embodiments described in this "Forecasting the Impact of Likely Violations" section.

Figure 6:
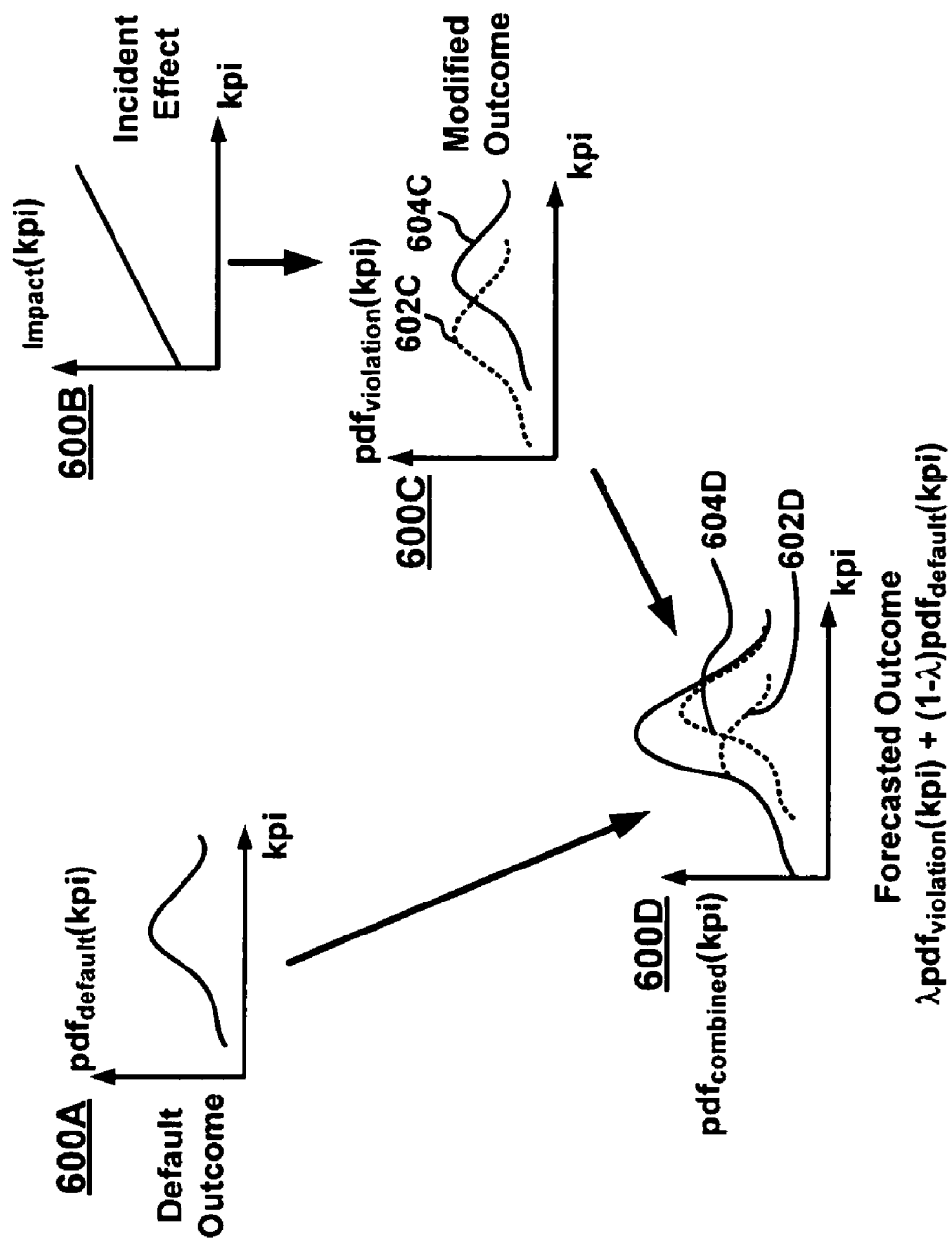
FIG. 6 depicts graphs of calculations used for forecasting the impact of violations, according to one embodiment.

According to one embodiment, the impact of a likely violation is forecasted. FIG. 6 depicts graphs of calculations used for forecasting the impact of violations, according to one embodiment. Graphs 600A, 600B, 600C, and 600D depict graphs based on calculations using equations 1, 3, 4, 5 respectively, as will become more evident.

The complexity required in modeling the effect that actions taken by IT managers have on KPIs—and consequently on business objectives—can quickly grow beyond acceptability. Episodes 450 can be used to manage this complexity, for example, by inserting episodes 450 between KPIs, as represented by KPI instance 530 and KPI type 440, and consequences 470 that result from taking actions.

Whereas there are many types of actions that can be taken, there are relatively few different types of episodes which can be described easily in terms of the metrics that underlie KPIs.

For the sake of illustration, assume the following business objectives and the respective KPIs. The first business objective states that "the aggregate cost of penalty for SLO violation in a three month period shall be less than $10,000." The second business objective states that "the total number of SLO violations for all customers in a three month period should be less than 15." These two business objectives shall be frequently referred to in order to illustrate numerous embodiments of the present invention. For the sake of illustration, whatever actions an IT manager takes, the episodes that are relevant to KPIs shall be SLO violations. On identifying relevant episodes, the calculation of the alignment for any course of action can be split into two 220 and 230, according to one embodiment.

As a part of modeling the impact of a likely violation, a mapping between the closing time of a service incident and the measure of alignment with the business objectives is used, according to one embodiment. As a part of determining the mapping, the impact that a likely violation has on the KPIs that the objectives are based on can be evaluated. For the sake of illustration, deterministic functions are used to express the dependency between the closing time and the measure of alignment. For example, the following equation can be used to quantify the impact of a likely violation on the aggregate cost penalties KPI:

$$f_{impact}(kpi_{penalty})=kpi_{penalty}+penalty(SLO) \quad (2)$$

The equation 2 represents the value of the KPI measuring the aggregate cost of penalty that is increased by the penalty relative to the violation, for example, when a violation occurs, according to one embodiment. Equation 3 represents the marginal impact that one more violation would cause, as illustrated by graph 600B:

$$f_{impact}(kpi_{violation})=kpi_{violation}+1 \quad (3)$$

For example, another violation may result in a new distribution 540. More specifically, if the distribution ranged from $7500 to $10,500 and an incident had a 75% probability of becoming a violation that resulted in a $1000 penalty, the new distribution would be increased taking into account the 76% probability and the $1000 penalty.

The modified outcome, using the following equation 4 and as illustrated by graph 600C, that follows a violation can therefore be obtained based on the impact of the violation, for example using equation 3, and the default outcome, for example using equation 1:

$$Pdf_{violation}(kpi)=pdf_{default}(f^{-1}_{impact}(kpi)) \quad (4)$$

The dotted curve 602C in graph 600C represents the default outcome and the solid curve 604C represents the modified outcome. According to one embodiment, the modified outcome can be calculated by dividing the default outcome by the impact of the violation as depicted in equation 4 above.

Further, the likely outcome of closing an incident by a given time can be determined. The likelihood of a violation as a function of time to close the incident has already been determined for example in 220. The forecasted outcome, as illustrated by graph 600D, can be determined using equation 5 depicted below. The forecasted outcome can be determined based on the combination of the default outcome 602D if the violation does not occur, for example using equation 1, and the modified outcome 604D if the violation does occur, for example using equation 4.

$$Pdf_{combined}(kpi)=(1-\lambda)pdf_{default}(kpi)+\lambda pdf_{violation}(kpi) \quad (5)$$

Computation of Alignment

As already stated, an alignment with business objectives as a function of the likelihood of the service level objective violation is computed, according to one embodiment. To compute the alignment with business objectives, a probability density function for the outcome within the target region, defined by the objective in the KPI space for example, can be integrated as depicted by equation 6 below:

$$alignment_{objective} = \int_{kpi \in Target(objective)} pdf_{combined}(kpi) dkpi \quad (6)$$

The alignment of the outcome with all the business objectives can be computed, for example, by summing the contribution of the alignment with each of the business objectives, each taken with their own weight, as depicted by equation 7 below:

$$alignment = \sum_{\forall\ objective} weight_{objective} \times alignment_{objective} \quad (7)$$

According to one embodiment, an outcome is what happens and an alignment is a measurement of the outcome. A default alignment can be a measurement of the default outcome. An alignment in case of a violation can be a measurement of the modified outcome. Because of the linearity of the combination depicted in equation 7, the default alignment and the alignment in case of violation could be computed independently of each other and then linearly combined with the likelihood of a service level objective violation, which was discussed in 220. The default alignment, the alignment in case of violation, and the likelihood of the service level objective violation could be linearly combined. The end result will not change, and the calculations may be simpler and faster to carry out, since it is simpler to deal with scalars than with probability density functions, and the number of integrations required can be dramatically reduced.

To illustrate 230, assume that a service degradation incident which relates to an SLO for which the expected time from jeopardy to violation is three hours. As already described herein, the likelihood of an expected violation to closing the incident in four hours can be represented with $1-e^{-4/3}=76\%$. For the sake of illustration, assume that the penalty associated with violating the incident is $1,000.

Further for the sake of illustration, assume that two business objectives have been defined. The first objective states that the aggregate cost of penalty for a violation in a three month period should be less than $10,000. The second objective states that the total number of violations for all customers in a three month period should be less than 15. Further assume that the objectives are deemed to be equally important, therefore each have an associated importance weight of ½.

Assume that two months into the period, the current reading of the KPIs will be $6,000 in penalties paid for 10 violations, according to one embodiment. For the sake of illustration, it has been assumed that the forecasting model predicts a default outcome characterized by uniform distributions with extremes ranging from $7,500 to $10,500 for the penalty KPI and a set of possible number of violations, e.g., {13, 14, 15, 16, 17}, for the violations KPI. The range from $7,500 to $10,500 and the set {13, 14, 15, 16, 17} are two examples of KPI spaces.

The alignment with the business objectives entailed by the default outcome, referring to equation 1, can be computed as the probability of meeting the objectives given the expected default outcome. Continuing the illustration, for the first objective an alignment measure of ⅚ is obtained, e.g. such that the probability of the penalty KPI will be below $20,000 given that it is distributed uniformly in the range of $7,500 to $10,500. For the second objective the alignment measure is ⅖. Therefore, the alignment with all business objectives is therefore $½*⅚+½*⅖=31/60=0.517$, according to one embodiment.

The impact of the likely violation on the KPIs results in an increase to the penalty figure by $1,000 and the number of violations by 1, according to one embodiment. According to one embodiment, this could therefore define an outcome characterized by uniform distributions with extremes ranging from $8,500 to $11,500 for the penalty KPI and set of possible number of violations {14, 15, 16, 17, 18} for the violations KPI. If the violation were to occur, that would entail alignments of ½ and ⅕ for each objective respectively, and therefore an alignment with all business objectives of $½*½+½*⅕=7/20=0.440$, according to one embodiment. Since, according to this illustration, the violation is expected to occur with a 76% likelihood, the alignment for the forecasted outcome becomes $24\%*0.517+76\%*0.440=0.390$.

In 240, the service degradation incident is prioritized to maximize an alignment with the business objectives, for example, by an incident prioritizer 130. According to one embodiment, the user, such as an IT administrator, provides constraints on what are the acceptable distributions of incidents into priority levels. According to another embodiment, a learning module can mine information about incidents to provide constraints.

For example, for any priority level the user can either force the incidents to be classified according to some predefined distribution, e.g., 25%-30% high, 40%-50% medium, 25%-30% low, or can define a minimum and maximum number of incidents to be assigned to each priority level. More specifically for the sake of illustration assume the constraints specify that there are 5 priority levels and 100 incidents can be assigned to each of the 5 priority levels. If there are 500 incidents, then 100 of the incidents can be assigned to each of the 5 priority levels.

Although many of the embodiments are described using minimum and maximum numbers of incidents, upper and lower limits or bounds can be used instead.

According to one embodiment, the incidents are assigned to the priority levels to maximize an alignment with business objectives. Examples of business objectives are revenue earned over time, the cost of penalties for violations, minimizing penalties for violations, minimizing the number of SLAs, or a combination thereof. For example, if incident A results in a higher penalty than incident B, then incident A may be assigned a higher priority than incident B.

For the purpose of illustration, assume hereon that an expected maximum closing time for the incidents that are assigned to a certain priority level is provided.

The Incident Prioritization Problem

According to one embodiment, a mathematical formulation of the incident prioritization problem is used as an instance of the generalized assignment problem. For example, integer optimization, which is very efficient, can be used for generalized assignment. For the purpose of illustration, assume that n incidents $i_1 \ldots i_n$ are prioritized using m priority levels $p_1 \ldots p_m$. A variable $x_{jk}$, $j=1 \ldots m$, $k=1 \ldots n$ can be used where $x_{jk}=1$ if the $k^{th}$ incident is assigned to the $j^{th}$ priority level and $x_{jk}=0$ otherwise.

The alignment of each incident can be calculated depending on what priority level each incident is assigned to, if $t_j$ is the expected time of completion for incidents assigned to priority level j, then the alignment yielded by assigning the $k^{th}$ incident to the $j^{th}$ priority level can be given by the alignment of closing the incident by the time $t_j$, which can be computed using various embodiments already described herein. For the purpose of illustration assume that $a(i_k, t_j)$ represents the measurement of alignment.

According to another embodiment, the constraints that the user imposes on the distribution of the incidents into priority levels can be translated into minimum and maximum capacity constraints for the priority levels. For example, when dealing with n=200 incidents, the requirement that at least 40% of the incidents, e.g., 40%×200 incidents=80 incidents, will be assigned medium priority, assuming priority level $p_2$ may be represented by:

$$\sum_{k=1}^{n} x_{2k} \geq 80$$

According to yet another embodiment, a minimum ($c_j$) and maximum ($C_j$) capacity constraint are assigned for a priority level j that can be represented by:

$$\sum_{k=1}^{n} x_{2k} \geq c_j \text{ and } \sum_{k=1}^{n} x_{2k} \leq C_j \; \forall \; j = 1 \ldots m \quad (8)$$

Therefore, the mathematical formulation of the incident prioritization problem (IPP), according to one embodiment, can be represented by:

$$(IPP) \sum_{j=1}^{m} \sum_{k=1}^{n} a(i_k, t_j) * x_{jk} \quad (9)$$

$$s.t. \sum_{k=1}^{n} x_{2k} \geq c_j \text{ and } \sum_{k=1}^{n} x_{2k} \leq c_j \; \forall \; j = 1 \ldots m \quad (10)$$

$$\sum_{j=1}^{n} x_{2k} = 1_j \; \forall \; j = 1 \ldots n \quad (11)$$

$$x_{2k} = 0 \text{ or } 1 \; \forall \; j = 1 \ldots m, k = 1 \ldots n \quad (12)$$

According to one embodiment, the solution using equations 8-12 depicted above yields an optimal assignment of priorities to the incidents based on business objectives. Prioritizing service degradation incidents based on business objectives decreases the probability that incidents will negatively impact the delivery of services that an outsourcing customer uses and thus, minimizes the penalties that an IT service provider may have to pay directly or indirectly. By prioritizing incidents based on business objectives, 100s of incidents for multiple outsourcing customers, such as 20 or more outsourcing customers can be managed.

In 240, the method stops.

Incident Prioritization Pseudo-Code

The following is pseudo-code that can be used for incident prioritization, according to one embodiment. First the inputs and the outputs to the pseudo-code are listed.

The inputs can include:

A number of SLOs, each modeled with the following information: violation threshold for an SLO, jeopardy threshold for an SLO, penalty cost for a violation, expected time to move from jeopardy to violation, e.g., if no corrective measures are taken.

A set of priority levels for incidents, modeled with the following information: constraints over the number of incidents to be assigned to each priority level, expected maximum closing time of incidents assigned to the priority level.

A number of service degradation incident, modeled with the following information: incident start time, for example the time when a jeopardy alarm was raised.

The outputs can include:

A complete prioritization of the incidents. For example, the incidents can be prioritized by assigning priority levels to the incidents.

An example of the pseudo-code is:

1.0 Compute the default alignment with business objectives, for example using equation 1. Note that although the default alignment could be computed repeatedly for each incident, the pseudo-code can be optimized by computing the default alignment out of the loop since the default alignment is the same for all incidents, according to one embodiment.

2.0 For each incident:

2.1 For each priority level:

2.1.1 receive a likelihood of a service level objective violation occurring as function of an amount of time taken to close a service degradation incident, for example, assuming that the incident is assigned to a particular priority. Refer to the description of 220 for more information on receiving the likelihood of a service level objective violation.

2.1.2 compute an alignment with business objectives as a function of the likelihood that the service level objective violation will occur. Refer to the description of 230 for more information for computing an alignment.

3.0 prioritize the service degradation incident to maximize the alignment with business objectives for example using the computed alignment. Refer to the description of 230 for more information on the computed alignment and refer to the description of 240 for more information on prioritizing the service degradation incidents to maximize the alignment with business objectives, for example, using the computed alignment with business objectives.

Figure 7:
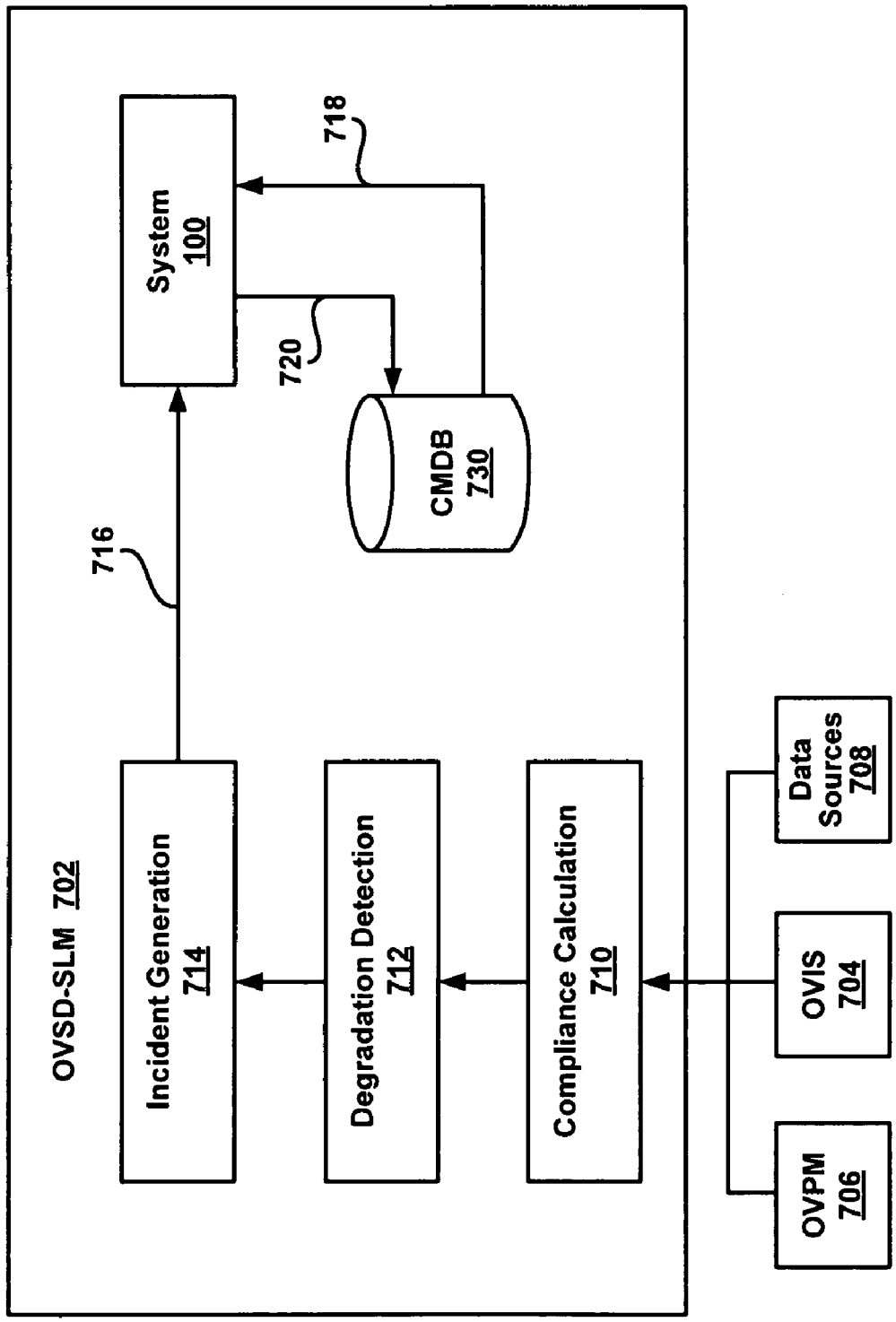
FIG. 7 depicts a block diagram of an architecture that uses a system for prioritizing service degradation incidents based on business objectives, according to one embodiment.

Architecture that Uses a System for Prioritizing Incidents Based on Business Objectives FIG. 7 depicts a block diagram of an architecture that uses a system for prioritizing service degradation incidents based on business objectives, according to one embodiment. The blocks that represent features in FIG. 7 can be arranged differently than as illustrated, and can implement additional or fewer features than what are described herein. Further, the features represented by the blocks in FIG. 7 can be combined in various ways. The system 700 can be implemented using software, hardware, firmware, or a combination thereof.

System 100 can be used in conjunction with a number of IT service management tools or incident management tools. According to one embodiment, as depicted in FIG. 7, HP™'s Openview Service Desk™—Service Level Management 702 (OVSD-SLM) is used for managing services, and in particular managing incidents. OVSD-SLM 702 can be used to define a hierarchical service structure with multi-tiered SLA capabilities to describe the relationship between a higher level business service and the supporting operation management service.

System 100 can be used in conjunction with many different monitoring tools for service level management, which provide monitoring availability and response time as well as providing notification of outages, slowdowns, etc. . . . According to one embodiment, HP™'s OpenView Internet Services™ 704 (OVIS) is used. OVIS 704 can be used to build a highly scalable extensible architecture that allows programmers to build probes for a wide variety of data sources.

The OVSD-SLM 702 can receive data feeds from data sources as diverse as OpenView Internet Services 704 (OVIS), OpenView Performance Manager 706 (OVPM) and other data feeders 708. OVSD-SLM 702 can provide various service level management functions as represented by 710, 712, 714, among other things. For example, the compliance calculator 710 can determine whether current measurements comply with existing service level objectives (SLO). This compliance calculator 710 can use service level agreements contained in the configuration management database (CMDB) 730 from which SLOs can be extracted. Multiple compliance thresholds can be defined for each SLO such as violation and jeopardy thresholds. This allows for proactive management of incidents.

The Degradation and Violation Detector 712 can detect that a particular metric, as already described herein, associated with an SLO has either reached a degradation threshold or has reported values that have exceeded the degradation threshold and therefore are violating the SLO. In either case, the incident generator 714 can report the violation or degradation as an incident.

The generated incident can be characterized from a business perspective. For example, at 716 the system 100 can be invoked for prioritizing the incident. System 100 can be automatically notified of SLA jeopardy alarms. On notification, the system 100 can obtain 718 the open incidents from the CMDB 730 and extract the incidents that have not yet been handled, along with their related SLAs and penalties.

The system 100 can prioritize the incidents, as already described in the context of FIG. 2. The prioritizations of the incidents can be stored on the CMDB 730. The system 100 can re-calculate prioritizations of incidents, for example, as new incidents occur and as old incidents are taken care of. For example, incidents A, B, and C may be detected and prioritized. Then when another incident D is detected the prioritizations of A, B, or C may be changed for example if incident D should have a higher priority than incident A, B, or C.

4.0 The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

CONCLUSION

Although many of the embodiments were described with service level objective violations, various embodiments can be generalized to any type of service level violations. Although many of the embodiments were described in the context of a likelihood of a service level objective violation occurring, according to one embodiment, likelihood is a probability.

What is claimed is:

1. A method of prioritizing services based on business objectives, the method comprising:
    monitoring at a computer metric values associated with service degradation incidents, wherein said metric values comprise service level jeopardy threshold values, wherein when a service level jeopardy threshold value of said service level jeopardy values is exceeded, a probability of a service level violation occurring is indicated, wherein said service level violation corresponds to a possible service degradation incident of said possible service degradation incidents, said possible service degradation incident being a possible degradation of service that may be experienced by a service user of a plurality of service users;
    determining at said computer a probability of said service level violation occurring within a predetermined time period based on said service level jeopardy threshold being exceeded, wherein said service level violation corresponds to said possible service degradation incident;
    computing at said computer an alignment of a delivery of a service with an at least one business objective based on said service level violation to achieve an alignment computation, wherein said alignment computation is a measure of a likelihood expressed as a percentage that said at least one business objective will be met, wherein said at least one business objective comprises financial objectives of a service provider and business objectives relating to said plurality of service users; and
    prioritizing at said computer said possible service degradation incident based on said alignment, wherein said prioritizing comprises determining a place in line for said possible service degradation incident, said line comprising said possible service degradation incidents, said place in line signifying to said service provider when action should be taken to address said possible service degradation incident, thus enabling an optimum reduction of financial penalties and repercussions for said service provider that would result from said possible service degradation incident occurring.

2. The method as recited by claim 1, wherein the computing at said computer of an alignment further comprises:
    forecasting a value of a key performance indicator (KPI), assuming said service level violation will not occur, to achieve a forecasted value, wherein said forecasted value is a default outcome that is computed by calculating a a mean value of said KPI along with a customized variance of said KPI.

3. The method as recited by claim 2, wherein said mean value of said KPI that is predicted at an end of a period by extrapolating a current value of said KPI.

4. The method as recited in claim 1, wherein said computing at said computer an alignment further comprises:

calculating an impact that said service level violation would have on said KPI that said at least one business objective is based on.

5. The method as recited in claim 4, wherein said calculating of an impact that said service level violation would have on said KPI further comprises:

calculating an impact that said service level violation would have on said KPI using an equation $f_{impact}(kpi_{penalty})=kpi_{penalty}+penalty(SLO)$, wherein all variables are measured in the same monetary units.

6. The method as recited in claim 1, wherein said computing at said computer an alignment further comprises:

calculating a marginal impact on said likelihood that said at least one business objective will be met should one or more service level violations occur to achieve a marginal impact calculation, said one or more service level violations affecting a variance comprising said alignment computation, wherein if a value of said variance increases, said likelihood of said at least one business objective being met decreases, and if said value of said variance decreases, said likelihood of said at least one business objective being met increases.

* * * * *